US006393369B1

(12) United States Patent
Carr

(10) Patent No.: US 6,393,369 B1
(45) **Date of Patent: *May 21, 2002**

(54) SYSTEM FOR CONTROL OF BLOOD PROCESSOR

(75) Inventor: Raymond A. Carr, Lutz, FL (US)

(73) Assignee: Bristol-Myers Squibb Company, Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/302,487

(22) Filed: Apr. 30, 1999

(51) Int. Cl.[7] .............................................. B01D 21/26

(52) U.S. Cl. ............................ 702/50; 702/19; 702/21; 702/31; 210/782

(58) Field of Search ........................ 702/50, 19, 21–23, 702/45, 25–27, 29–32, 46, 55, 113, 114, 122, 123, 183, 188, FOR 120, FOR 17, FOR 127, FOR 128, FOR 134, FOR 103, FOR 104, FOR 115–FOR 119, FOR 121; 700/2, 3, 9, 10, 86, 87, 266–269, 271, 273, 275, 282, 283, 285; 210/781, 782, 787, 789, 198.1, 206, 209, 360.1, 380.1, 210, 645, 141–143, 145; 494/7–9, 10, 11, 27, 43, 35–37, 41; 422/72, 73, 101, 68.1, 67, 50, 55–57, 62, 82, 82.05, 82.09; 436/177, 45, 66, 43; 604/4.01, 5.01, 6.01–6.08; 530/382, 381; 435/13

(56) References Cited

U.S. PATENT DOCUMENTS

| | | | | | |
|---|---|---|---|---|---|
| 5,603,845 | A | * | 2/1997 | Holm | 210/782 |
| 5,702,357 | A | * | 12/1997 | Buinbridge et al. | 604/4.01 |
| 5,721,676 | A | * | 2/1998 | Bolden et al. | 702/19 |
| 5,738,784 | A | * | 4/1998 | Holm et al. | 604/5.01 |
| 5,830,352 | A | * | 11/1998 | Holm | 210/198.1 |
| 5,865,718 | A | * | 2/1999 | Chan | 700/273 |
| 6,060,022 | A | * | 5/2000 | Pang et al. | 436/43 |

* cited by examiner

*Primary Examiner*—Hal Wachsman
(74) *Attorney, Agent, or Firm*—Stuart E. Krieger; John M. Kilcoyne; Theodore R. Furman, Jr.

(57) ABSTRACT

A blood processor is provided with a computer and memory, and external to the blood processor there is provided a general purpose computer system programmed with a convenient interface for creating scripts; the general purpose computer system translates the scripts into custom interpretive code adapted for processing by the computer in the blood processor, and the code is written into the memory of the blood processor via the computer in the blood processor.

11 Claims, 6 Drawing Sheets

Fig. 5

| | | | | |
|---|---|---|---|---|
| 72 | Flywheel Decelerate | Final Speed | 2000 | RPM |
| | | Deceleration Rate | 1000 | RPM/s |
| 73 | Piston Wait | | | |
| 74 | Piston Position | Position | 370 | 1/10 of mm |
| | | Speed | 400 | steps/s |
| | | Acceleration Rate | 400 | steps/s/s |
| | | Deceleration Rate | 400 | steps/s/s |
| | | Torque Limit | Medium | |
| 75 | Piston Wait | | | |
| 76 | Flywheel Stop | Deceleration Rate | 3000 | RPM/s |
| 77 | Pause | Time | 3 | Seconds |
| 78 | Flywheel Agitate | Speed | 2500 | RPM |
| | | Acceleration Rate | 3000 | RPM/s |
| | | Time/Direction | 5 | Seconds |
| | | Total Cycle Time | 30 | Seconds |
| 79 | Flywheel Accelerate | Final Speed | 9000 | RPM |
| | | Acceleration Rate | 1500 | RPM/s |
| 80 | Pause | Time | 540 | Seconds |
| 81 | Flywheel Decelerate | Final Speed | 500 | RPM |
| | | Deceleration Rate | 150 | RPM/s |
| 82 | Piston Serum Removal | Position | 110 | 1/10 of mm |
| | | Speed | 400 | steps/s |
| | | Acceleration Rate | 400 | steps/s/s |
| | | Deceleration Rate | 400 | steps/s/s |
| | | Torque Limit | Medium | |
| 83 | Piston Wait | | | |
| 84 | Flywheel Stop | Deceleration Rate | 100 | RPM/s |
| 85 | Piston Position | Position | 370 | 1/10 of mm |
| | | Speed | 150 | steps/s |
| | | Acceleration Rate | 400 | steps/s/s |
| | | Deceleration Rate | 400 | steps/s/s |
| | | Torque Limit | Medium | |
| 86 | Piston Wait | | | |
| 87 | Pause | Time | 5 | Seconds |
| 88 | Flywheel Accelerate | Final Speed | 300 | RPM |
| | | Acceleration Rate | 300 | RPM/s |

SYSTEM FOR CONTROL OF BLOOD PROCESSOR

RELATED APPLICATIONS

This application is related to the following U.S. Patents, each of which is incorporated herein by reference for their useful background information in understanding a complex blood processor:

- U.S. Pat. No. 5,603,845, naming as the inventor Niels E. Holm, issued Feb. 18, 1997, and describing a complex blood processor apparatus for separating a liquid sample having phase portions of different densities, such as blood;
- U.S. Pat. No. 5,733,446, naming as the inventor Niels Erik Holm, issued Mar. 31, 1998, and describing a complex blood processor apparatus for separating fibrin I from blood;
- U.S. Pat. No. 5,738,784, naming as the inventors Niels E. Holm and Peter A. D. Edwardson, issued Apr. 14, 1998, and describing a complex blood processor apparatus for separating a blood component from blood or plasma; and
- U.S. Pat. No. 5,830,352, naming as the inventor Niels Erik Holm, issued Nov. 3, 1998, and describing a complex blood processor apparatus for delivering a reagent in a preparation unit.

BACKGROUND OF THE INVENTION

1. Field of the Invention

This invention relates to a method and system for controlling a blood processor. To be more particular, this invention is especially applicable to a blood processor that produces fibrin sealant. In its most specific embodiment, the invention is a method and system for controlling a blood processor to produce autologous fibrin sealant.

2. Related Art

A blood processor may be understood, in general is terms, as a machine that performs some process on blood. The blood may be human blood. A simple centrifuge may thus be thought of as a primitive blood processor.

Blood processors range in complexity from very simple to very complex. The complexity of a blood processor may be thought of as being in direct relation to the number, the kind, and the delicacy of the processes it performs.

For example, the separation of red blood cells with a centrifuge is, by itself, a fairly simple process. A blood processor to perform only such a separation needs only relatively simple controls, such as an on/off switch, a speed setting, or the like. In a similar vein, a highly complex apparatus for processing blood might require a myriad of controls.

Complex blood processing procedures may require several steps. The more complex a procedure is, the more desirable it becomes to automate as much of the procedure as possible so as to avoid human error and also to promote uniformity in execution of the steps.

To automate processing in a blood processor, it is known to include in the blood processor an application specific integrated circuit (ASIC). An ASIC is designed to control the operation of the blood processor through the several or many steps of a complex blood processing procedure. An ASIC is a reliable and useful control mechanism for automating a blood processor.

An ASIC is disadvantageous, however, in the respect that it cannot be freely modified. In a highly complex blood processor, capable of performing many different operations and steps, this is a disadvantage because new procedures or modifications of old procedures may be desired. A blood processor with only an ASIC cannot be freely modified to execute such procedures.

SUMMARY OF THE INVENTION

It is an object of the invention to provide a system for the convenient production and modification of the control programs that control the automated execution of blood processing procedures.

To achieve this objective, a blood processor is provided with a computer and memory, and external to the blood processor there is provided a general purpose computer system programmed with a convenient interface for creating scripts; the general purpose computer system translates the scripts into code of a custom interpretive language adapted to be interpreted by the computer in the blood processor, and the script of custom interpretive language instructions is written into the memory of the blood processor.

In one embodiment of the invention, multiple scripts are stored in the blood processor, and a barcode or the like on a disposable blood preparation unit indicates to the blood processor which of the multiple scripts should be invoked.

The invention will be better understood from the following description in which an exemplary embodiment is described in detail with the aid of the accompanying figures. It is to be understood that the described embodiment is merely an example of the realization of the invention and is for explanation only. In other words, the invention is not limited in its applicability to this one example.

BRIEF DESCRIPTION OF THE DRAWING FIGURES

FIG. 5 shows an example of a part of a script according to one embodiment of the invention.

DETAILED DESCRIPTION OF THE PREFERRED EMBODIMENT

Figure 1:
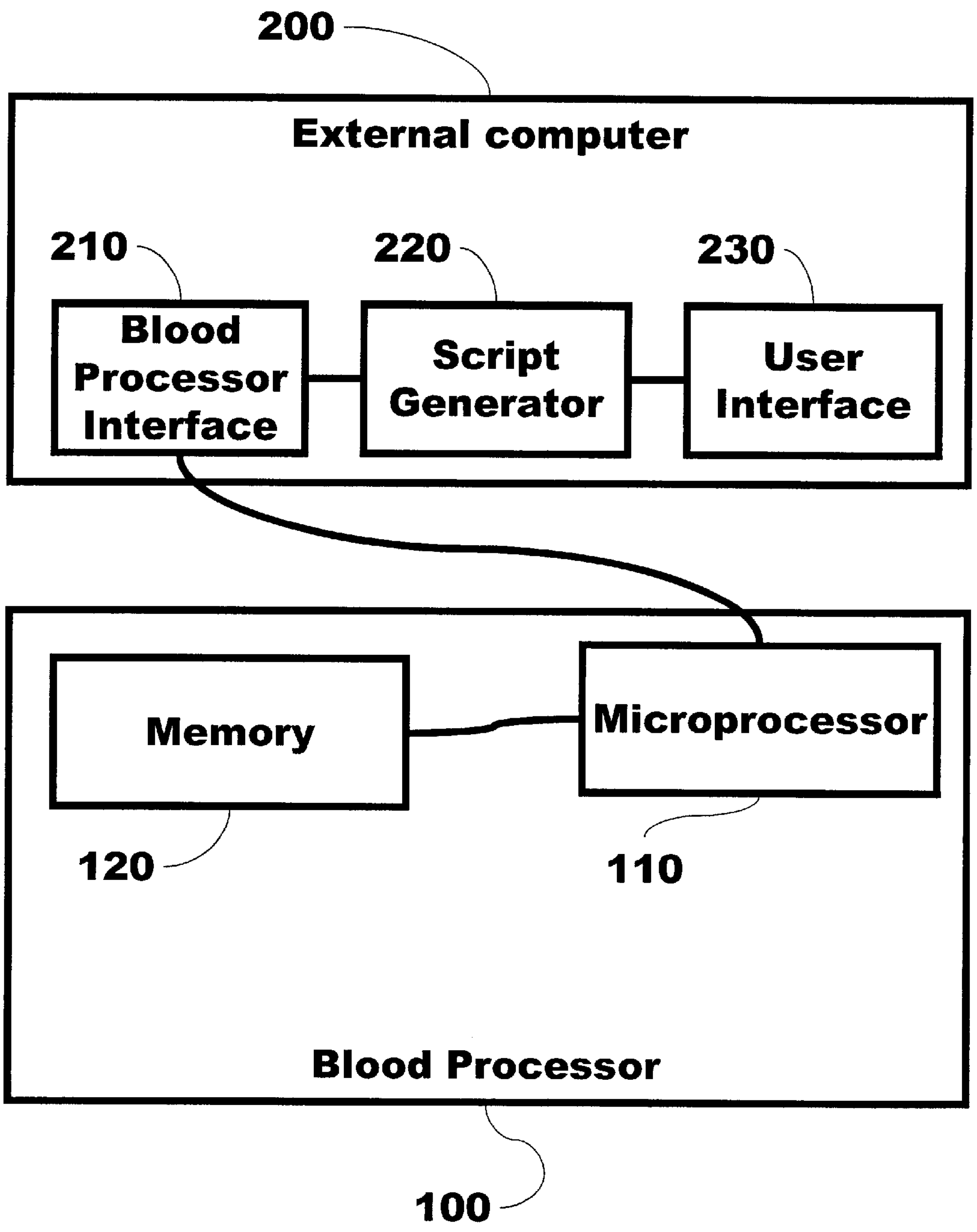
FIG. 1 shows, in simplified schematic form, a preferred embodiment of the invention.

In FIG. 1, a blood processor 100 is provided with a microprocessor 110 and a memory 120. An external computer 200 has a blood processor interface 210, a script generator 220, and a user interface 230. The external computer 200 is linked to the blood processor 100. To be more specific, the blood processor interface 210 of the external computer 200 is operably linked to write information into the memory 120 of the blood processor 100. The microprocessor 110 accesses the memory 120 to read the script of custom interpretive language instructions.

Figure 2:
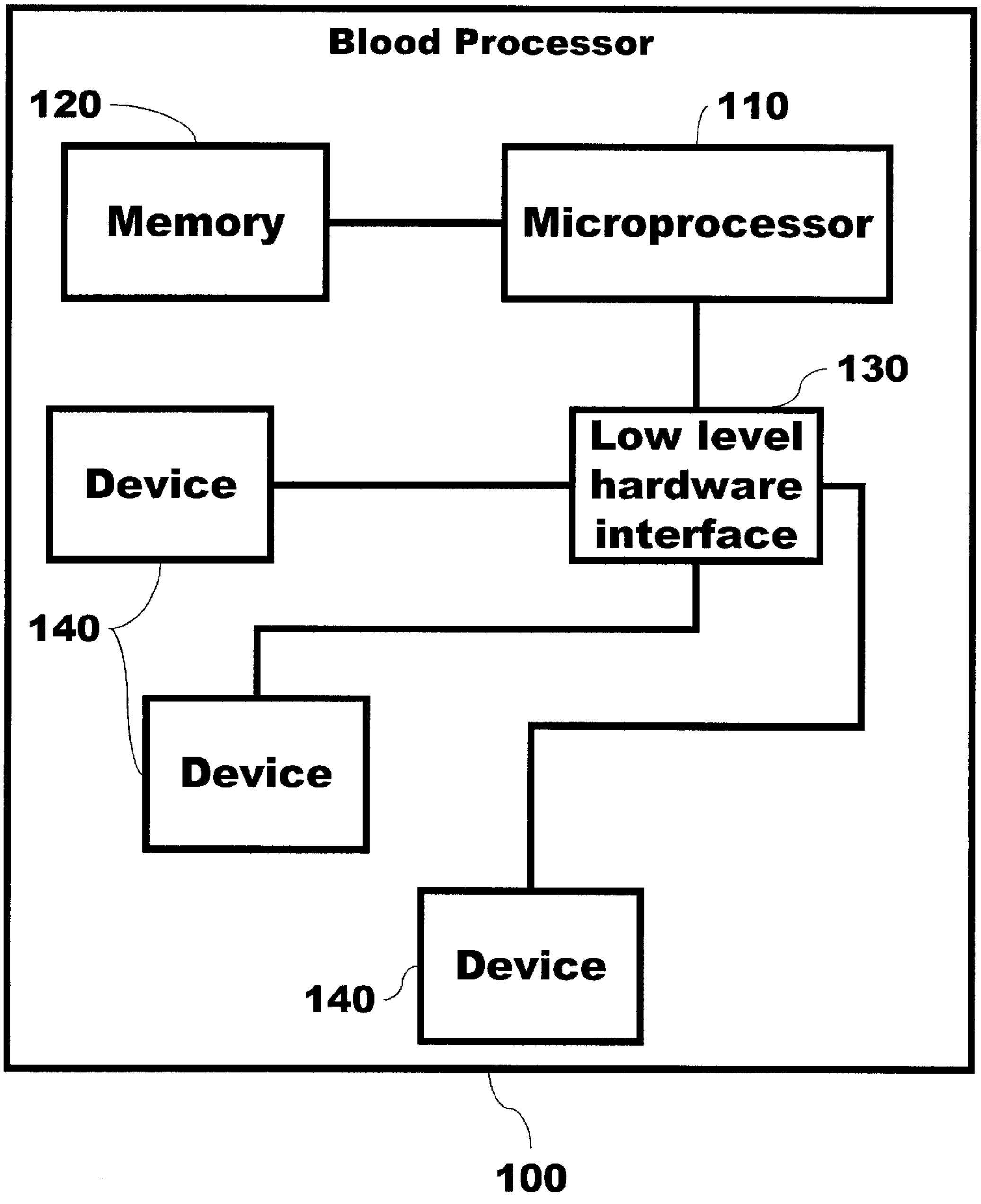
FIG. 2 shows, in simplified schematic form, a blood processor according to the invention.

As schematically shown in FIG. 2, the blood processor 100 is provided with a low level hardware interface 130 to which the microprocessor 110 is operably linked. The low level hardware interface 130 provides an interface whereby the microprocessor 110 may independently control a plurality of devices 140 of the blood processor 100.

As used here, "devices" means sensors, detectors, motors, actuators, displays, solenoids, or the like. Control of a device 140 may include receiving the input from a sensor or detector, driving a motor, actuator, display, or solenoid, or generally providing inputs to or taking output from any device 140.

In operation, the blood processor 100 according to the invention has, in memory 120, a program or set of programs readable by the microprocessor 110. The microprocessor 110 operates according to the program read from the memory 120. Typically, an input from one of the devices 140 will be used to initiate the blood processing procedure. For example, a blood processor 100 may have a start button. The start button is a kind of device 140. The start button, when activated, may output an electrical signal in response to the activation. This electrical signal passes to the low level hardware interface 130 and may be provided as an interrupt to the microprocessor 110.

In response to the signal from the start button, the microprocessor 110 may command the plurality of devices 140 in accordance with the program steps defined in the memory 120 of the blood processor 100. The program steps may be thought of as predefined scripts which the microprocessor 110 must follow.

It will be appreciated that the scripts stored in the memory 120 of the blood processor 100 are not generally intelligible by an unaided human. The program steps that comprise the scripts are in a custom interpretive language specially adapted to the blood processor 100. Furthermore, it will be appreciated that the scripts are not created inside the blood processor 100 apparatus, but are created externally and downloaded, via the computer of the blood processor 100, into the memory 120 of the blood processor 100. Downloading of such instructions is performed in a manner well known to those of skill in this field. The act of downloading instructions or scripts into memory 120 is not the subject of this invention, and detailed description thereof will be omitted for the sake of clarity.

Referring back to FIG. 1, there is represented an external computer 200 having a blood processor interface 210, a script generator 220, and a user interface 230. As mentioned, the blood processor interface 210 provides a means whereby the script of custom interpretive language instructions may be passed from the external computer 200 to the memory 120 of the blood processor 100. As with the aspect of the blood processor 100 concerned with downloading, this aspect of the external computer 200 is not further discussed in detail.

The script generator 220 and the user interface 230 of the external computer 200 are important in achieving the object of the invention. The key advantages of these components will be made apparent by first discussing a conventional way to generate instructions, and then by explaining the invention.

It is conventional to obtain machine language instructions for execution by a microprocessor 110 by writing source code of a human-readable programming language. Examples of human-readable programming languages are C, FORTRAN, BASIC, and C++, to name a few. The source code is typically stored on a computer-readable medium, such as a disk, and is used as an input to a compiler for the particular programming language.

A compiler may perform operations on the source code, as is well known in this field, and produce, as an output, machine language instructions. Compilers may also retrieve source code from associated files such as header files, and may retrieve machine language code from library files, as part of the operations of making machine language code corresponding to the input source code. The resulting machine language instructions may be stored in a file and downloaded to the blood processor 100.

Having briefly described the conventional manner of obtaining a set of instructions for execution by a microprocessor 110, an explanation will be given as to the script generator 220 and user interface 230 according to the invention.

According to the invention, there is provided a is user interface 230 working cooperatively with a script generator 220. The user interface 230 may be graphical in nature or not, although graphical user interface 230*s* are preferred for ease of use. The user interface 230 and script generator 220 may be customized to the architecture of the blood processor 100.

Figure 3:
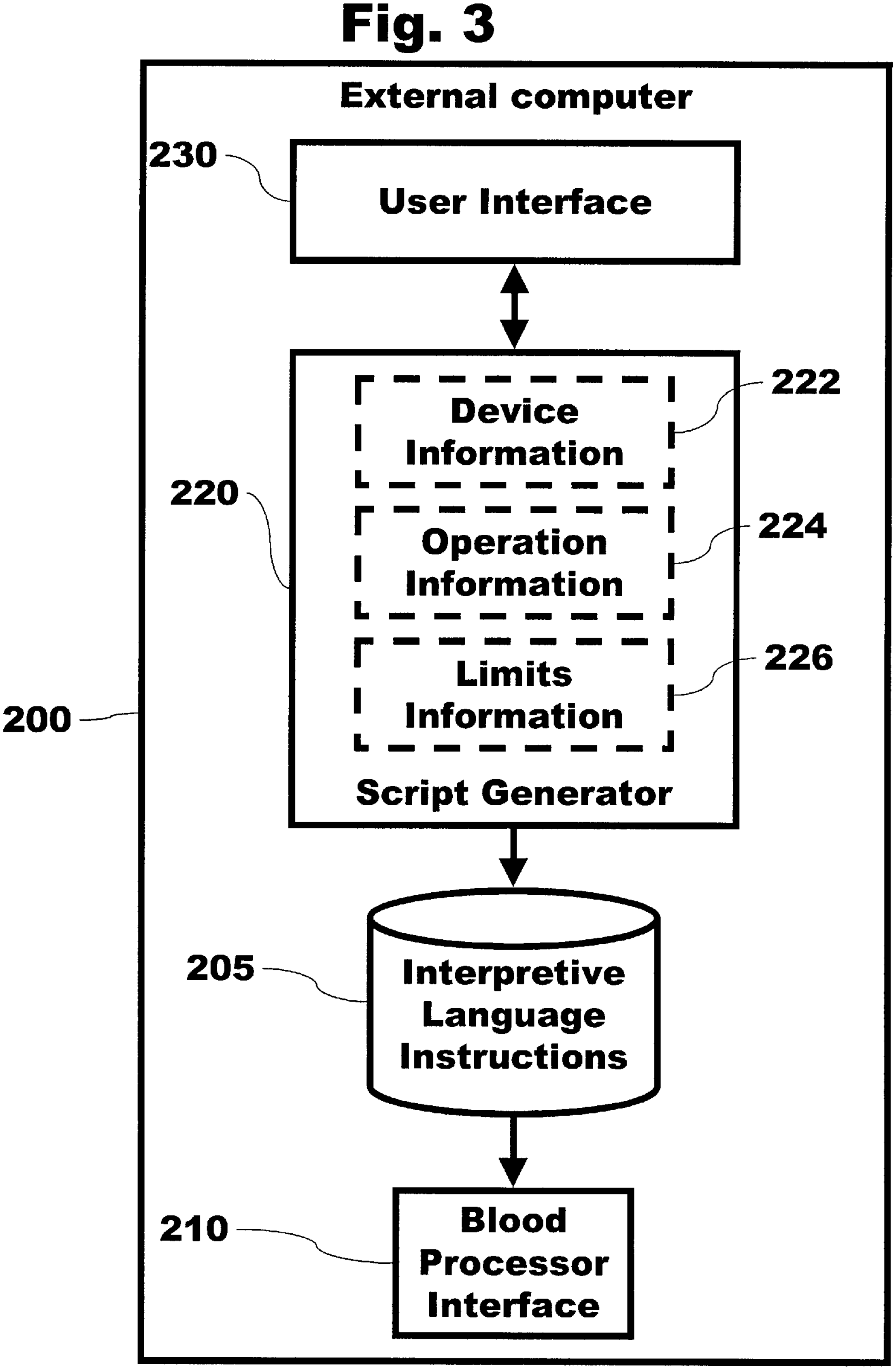
FIG. 3 shows, in simplified schematic form, an external computer featuring a user interface and script generator according to the invention.

The external computer 200 is depicted in FIG. 3.

The script generator 220 contains information of three general types:

- device information 222 relating to all of the different controls, sensors, buttons, and displays of the blood processor 100;
- operation information 224 that is indicative of the different operations that may be performed with respect to the devices; and
- limits information 226 that indicates operational limits for the operations.

These three types of information may be embodied in any manner. The presently preferred manner of embodying this information is exemplified in the following description made with respect to a shield that may be automatically raised, automatically lowered, and automatically locked.

The devices 140 associated with the shield include a stepper motor that moves the shield, a first sensor that detects the shield to be in a fully closed position, and a second sensor that detects the shield to be in a fully locked position.

The operations information associated with the foregoing may include operations of locking or unlocking the locking mechanism, of moving the shield in a closing or an opening direction, of stopping the shield, and the like.

The limits information 226 associated with the operations may include maximum speed of travel for the shield, maximum travel distance for the shield, and the like.

The following table shows how several operations may be defined:

```
enum commands {
  shield_open=0x0020,
  shield_close=0x0021,
  shield_lock=0x0022,
  shield_unlock=0x0023,
  shield_up=0x0024,
  shield_down=0x0025,
  shield_open=0x0020,
  shield_lock_detect=0x0026 . . .
```

Similarly, limits may be defined as:

```
#define shield_max_travel=1523
#define shield_home_position=0
#define shield_locked=1
#define shield_unlocked=0
#define shield_max_travel_speed=5
```

The user interface 230 might thus present a human readable form of each command from a menu, allowing the user to select from the permitted commands. The user might set up a script using commands such as:

Shield Close, speed=max

Shield Lock

Shield Compare lock-sensor, shield-locked

The above commands "Shield Close" and "Shield Compare" have associated parameters. For example, the Shield Close command may have a speed parameter associated with it. The speed parameter could be used to drive the shield stepper motor, for example, in larger or smaller steps.

The following table shows how an interpretive language command might be provided in response to the user selecting a particular command via the user interface. In the table, the user has entered a command to perform an "up" operation on the device that drives the shield, which device might be a stepper motor. The user interface requires the user to enter the necessary parameters, such as speed of the upward movement and distance to be traveled. The user interface conveniently displays the units that relate to the parameters of each operation.

| | Command | Parameters | Parameter values | Units |
|---|---|---|---|---|
| Human readable command | Shield up | Speed<br>Distance | 4<br>900 | steps per second<br>1/10 of mm |
| Interp. language command | | 0 × 0024, 4, 900 | | |

Here, the "shield up" command has been formed with the speed parameter being 4 steps/s, and the distance to travel being 900 tenths of a millimeter (i.e., 9 centimeters). The user interface, knowing that the maximum speed allowed for shield travel is 5 steps/s, does not permit the user to enter a value greater than 5 for the speed parameter. Likewise, the maximum travel allowed may also be checked against the to predetermined limit, i.e., shield__max__travel.

In the table above, the corresponding interpretive language command is shown. In particular, the shield__up command is changed into the hexadecimal value 24 (×24), which is the command identifier used by the microprocessor of the blood processor. The microprocessor is preprogrammed to respond to the command ×24 by controlling the stepper motor that drives the shield of the blood processor to move the shield in an upward direction. The parameters 4 and 900 are used by the microprocessor to control the stepper motor's speed (i.e., 4 steps per second) and the number of steps actually commanded (i.e., the equivalent of 9 cm). The numbers 4 and 900 are preferably converted to hexadecimal values as part of the script generation. Different commands will require different numbers of parameters.

The precise manner of making the defined commands easily readable through a graphical user interface 230 is not the subject of this application, and will be well within the capability of those skilled in interface design. Likewise, the precise manner of embodying the devices, operations, and limits information (222, 224, 226) in a computer program also is is not the subject of this application and, supplied with the above concepts, it is within the capability of the software and control systems engineer to actually study a blood processor 100 and to define a suitable set of commands and program steps.

The user interface 230 permits a user to select from different operations on corresponding devices 140 within particular limits. The script generator 220 takes the items and their parameters selected by the user, and produces corresponding instructions in the custom interpretive language. That is, the script generator 220 generates custom interpretive language instructions with the appropriate addresses and parameters that correspond to the set of steps selected by the user.

The user interface 230 and script generator 220 may be combined into a single module, of course, or broken down into several modules.

Variations are possible, but the central idea is to allow the user to create a script for the blood processor 100 without the necessity for the user to be a computer programmer.

The user interface 230 and/or script generator 220 should permit the storage of scripts for later recall and modification. Once the scripts of custom interpretive language instructions are thus stored, the blood processor interface 210 may be invoked to download the script into the memory 120 of the blood processor 100 via the blood processor 100.

A concrete example of a script generated according to the invention will now be described for illustration purposes only.

The VIVOSTAT™ system by the BRISTOL-MYERS SQUIBB company is an example of a highly complex blood processor 100 to which the invention is applicable. The VIVOSTAT™ system produces autologous fibrin sealant from a patient's own blood in approximately 30 minutes. The apparatus includes a start button and a display panel, which are the only controls making up the man/machine interface. In other words, the user inserts a preparation unit, pushes the start button, and waits while the blood processor performs a myriad of complex operations. The display panel indicates progress during the processing.

The VIVOSTAT™ system has numerous devices, as will become evident from the following description. An example of some of the human-readable set of steps to accomplish the automated blood processing phase is shown in FIG. 5. In FIG. 5, the first column includes step numbers, the second column includes operations (which are often descriptive of the device being operated on), the third column includes parameter information relating to the operations, the fourth column includes parameter values, and the fifth column includes unit-related information to make the script more easily readable.

The first line on FIG. 5, for example, relates to the 72d step in a series of steps. The operation relates to the flywheel device. The operation, to be precise, is a deceleration operation. The relevant parameters are the final speed and the deceleration rate. The final speed parameter is 2000 revolutions per minute. The rate of deceleration is 1000 RPM per second.

The second line of FIG. 5 is the 73*d* step in the series of steps. The device being controlled is the piston (mentioned below) of a preparation unit. The operation is a wait operation. In this instance, no parameters are applicable.

Figure 6:
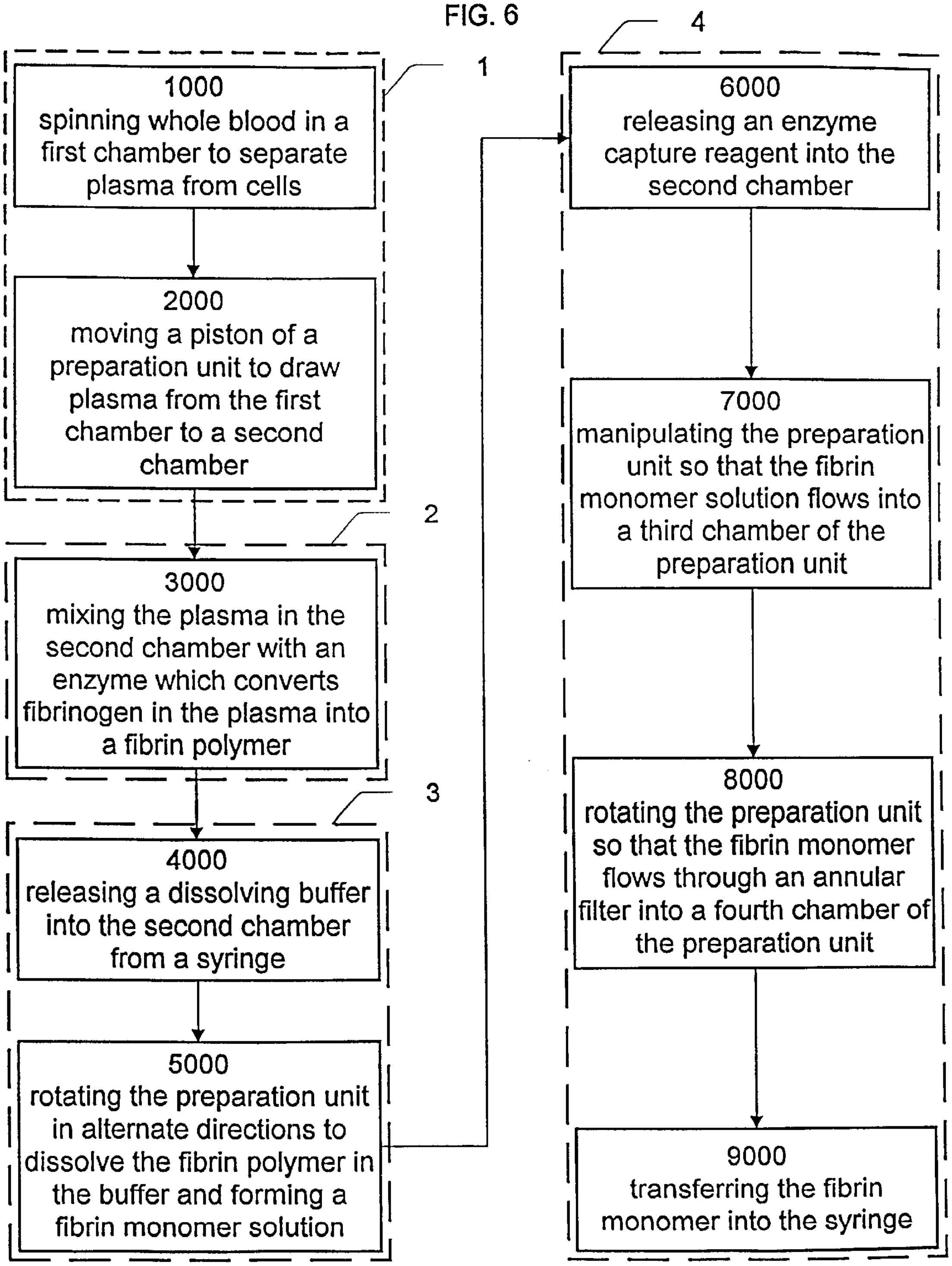
FIG. 6 is a flow chart showing a process for producing autologous fibrin sealant as an example of a complex process.

In general, to produce autologous fibrin sealant from whole blood, the following steps are taken (see FIG. 6);

A. During a preparation phase:

1. Manually, citrate is transferred into a reservoir chamber of a disposable preparation unit, e.g., a unit as described in any of the U.S. Pat. No. 5,603,845, the U.S. Pat. No. 5,733,446, or the U.S. Pat. No. 5,738,784 .
2. Whole blood is manually collected from the patient and directly transferred to the reservoir chamber.

1. A dissolving buffer syringe is manually placed in the preparation unit. The preparation unit with syringe is placed inside the VIVOSTAT™ blood processor unit.

B. During an automated processing phase:

4. The processor unit shield is closed. The preparation unit is engaged. A piston is moved down and enzyme (biotinylated batroxobin) is released from a cartridge inside the preparation unit into a reaction chamber of the preparation unit, e.g., as described in U.S. Pat. No. 5,830,352.
5. A halogen lamp, near infrared sensor-controlled heating system within the blood processor heats the preparation unit reservoir chamber until the temperature of the blood returns to 37° C.
6. The processor spins the preparation unit, separating the plasma from the cells (FIG. 6, step 1000). The cells aggregate on the wall of the reservoir chamber while the plasma forms an inner core.
7. The piston is moved up and draws the separated plasma core from the reservoir chamber into the reaction chamber (step 2000), there to mix with the enzyme. The piston moves to a height sufficient to draw 60 ml of plasma. A red blood cell detector is used to ensure that no red blood cells are drawn into the reaction chamber. Once mixing is complete, the preparation unit is spun at 9000 rpm, thus converting the fibrinogen into fibrin, which in this case is fibrin I, and which immediately polymerizes, the gel-like polymer being deposited on the wall of the reaction chamber in a thin film (step 3000).
8. The preparation unit is brought to a standstill. Air is drawn into the reaction chamber. The piston is moved so as to compress the air, forcing all but the fibrin I polymer and residual biotinylated batroxobin into the reservoir chamber. Short spins are performed so as to remove any additional residual plasma in the fibrin I polymer.
9. The dissolving buffer is released into the reaction chamber from the syringe (step 4000). The preparation unit is rotated in one direction, and then the other, repeatedly, so as to dissolve the fibrin I in the buffer and to produce a fibrin(I) monomer solution (step 5000). Avidin-agarose is released into the reaction chamber to act as an enzyme capture reagent (step 6000). The preparation unit is spun intermittently and the avidin-agarose complexes with the residual biotinylated batroxobin.
10. The fibrin I—enzyme complex mixture is caused to flow into a filtration chamber of the preparation unit (step 7000). The preparation unit is spun and centrifugal force transfers the fibrin I monomer solution through an annular filter into a collection chamber of the preparation unit (step 8000). Since the agarose-avidin-biotin-batroxobin enzyme complex is unable to pass through the annular filter, it remains in the filtration chamber.
11. The resulting purified fibrin I monomer solution is transferred from the collection chamber of the preparation unit back into the syringe (step 9000) via a safety filter. The shield is moved out of the way and the preparation unit is disengaged.

C. Application phase

12. The fibrin I monomer solution is combined with a ph10 buffer at the site of application, thus causing polymerization of the fibrin monomer into fibrin polymer.

For the sake of generality, the steps 1000 and 2000 may be referred to as a step for separating plasma from cells 1 (see reference numeral 1 in FIG. 6). The precise steps 1000 and 2000 described herein are but one way of accomplishing the function of separating plasma from cells, and one familiar with this field will appreciate that other equivalent steps can be performed to achieve this function.

Likewise, the step 3000 may be referred to as a step for converting fibrinogen in the plasma into a fibrin polymer (see reference numeral 2 of FIG. 6). Similarly, steps 4000 and 5000 may be referred to as a step for forming a fibrin monomer solution from the fibrinogen (see reference numeral 3 of FIG. 6). Likewise, steps 6000–9000 may be referred to as a step for transferring the fibrin monomer into a syringe (see reference numeral 4 of FIG. 6).

It will be appreciated that the user interface 230 and script generator 220 relieve the user of the task of programming in a programming language, and generate scripts in a custom interpretive language customized to the blood processor by virtue of the information contained in the device definition file and the operation definition file. The custom interpretive language instructions are downloaded into the blood processor 100 via the blood processor interface 210 and the computer onboard the blood processor 100.

Figure 4:
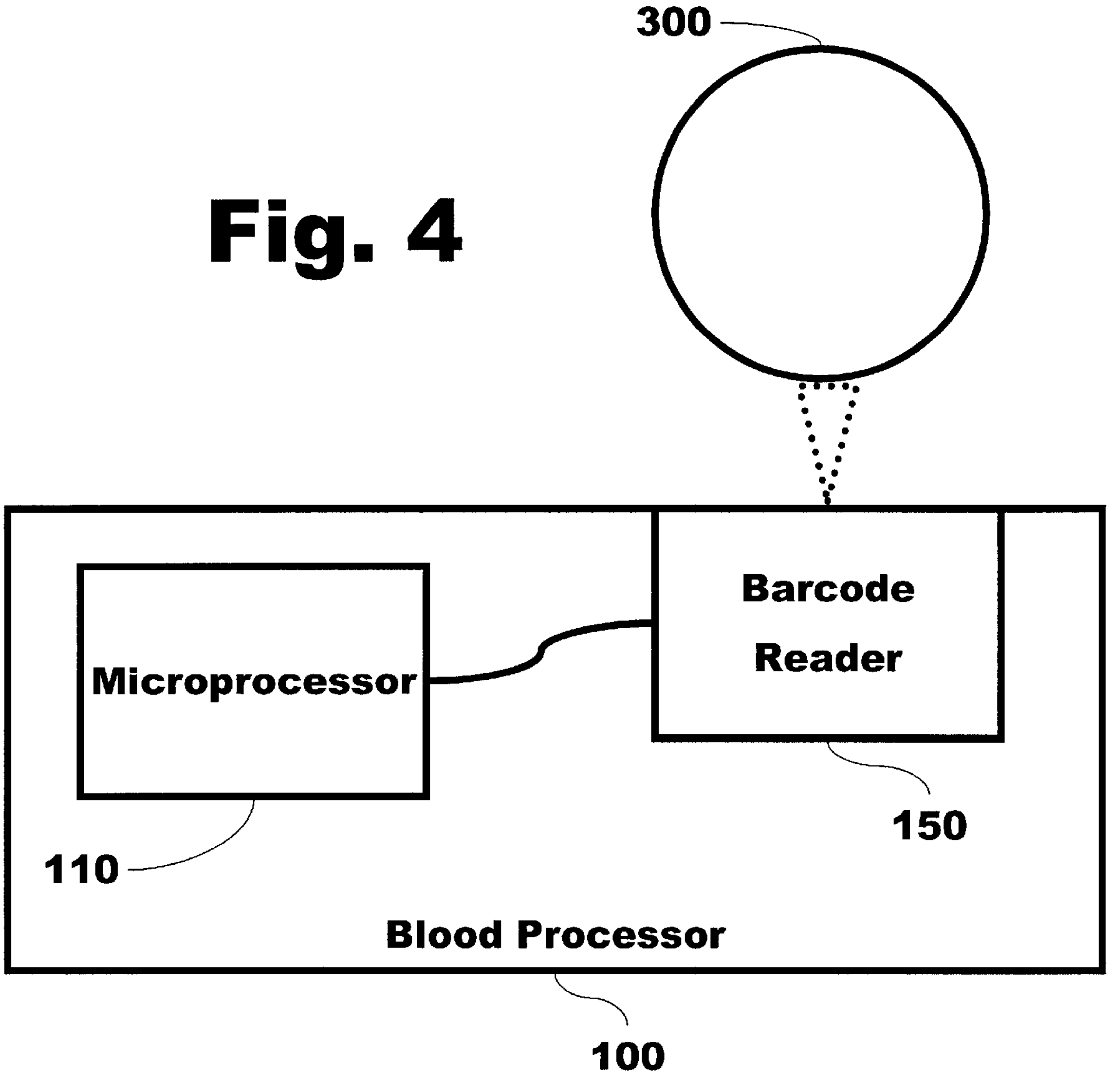
FIG. 4 shows a blood processor including a bar code reader according to one embodiment of the invention.

In another embodiment of the invention, the memory 120 of the blood processor 100 is capable of storing multiple scripts. This is advantageous when combined with a barcode scanner or the like in the blood processor 100. In FIG. 4, microprocessor 110 controls a barcode reader 150 to read a barcode (not shown) of preparation unit 300.

For example, a first script might relate to performing processing on blood in a normal manner, the amount of blood expected being 60 cc. In this hypothetical process, a first amount of another chemical is released from the above-identified syringe into the blood, perhaps 5 cc.

A second script might relate to performing the same general process, but for the blood of a neonatal infant. It would be unsafe to draw 60 cc of blood from the neonate, and so only a few cc would be drawn and used. The amount automatically dispensed from the syringe would need to be correspondingly reduced in the second script.

By affixing an appropriate barcode or other indicator on the disposable preparation unit 300, the barcode reader 150 or the like in the blood processor 100 may automatically obtain an indication of whether the first script or the second script is to be executed.

Additional scripts may be added to the blood processor so that a third script may be generated to perform blood processing in a third manner. Since the blood processor is not controlled by an ASIC, the scripts need not all be predefined; rather, scripts may be added or changed later, making the blood processor according to this embodiment of the invention especially advantageous.

For the sake of generality, it will be appreciated that a barcode reader is not the only means by which information from the preparation unit might be provided to the blood processor. It will occur to those familiar in this field to use optical character recognition, for example, or to use another indicator such as a certain shape or color of the preparation unit. The term "reader" will therefore mean all of these and similar ways of indicating, on the preparation unit, a different script should be followed. The term "indicator" will mean the identifying indicia or shape of the preparation unit detectable by the reader.

It is contemplated that numerous modifications may be made to the disclosed system for control of a blood processor, without departing from the spirit and scope of the invention as defined in the following claims.

I claim:

1. A system for controlling a blood processor, comprising:

a blood processor with a microprocessor and memory; and an external computer having a user interface and a script generator;

said blood processor having a plurality of devices, each with one or more respective operations;

said script generator including device information and operation information relating to said plurality of devices and said one or more respective operations;

said user interface being adapted to display said device information and said operation information;

said external computer recording a selected set of steps indicating selected ones of said one or more respective operations for said plurality of devices;

said script generator outputting, as a script, said selected set of steps in a custom interpretive language readable by said microprocessor of said blood processor; and said script being loaded into said memory of said blood processor;

wherein said selected set of steps include:

spinning whole blood in a first chamber to separate plasma from cells;

moving a piston of a preparation unit to draw plasma from said first chamber to a second chamber;

mixing said plasma in said second chamber with an enzyme which converts fibrinogen in said plasma into a fibrin polymer;

releasing a dissolving buffer into said second chamber from a liquid container;

rotating said preparation unit in alternate directions to dissolve said fibrin polymer in said dissolving buffer forming a fibrin monomer solution;

releasing an enzyme capture reagent into said second chamber;

manipulating said preparation unit so that said fibrin monomer solution flows into a third chamber of said preparation unit;

rotating said preparation unit so that said fibrin monomer solution flows through an annular filter into a fourth chamber of said preparation unit; and transferring said fibrin monomer solution into said liquid container; and wherein:

said preparation unit has an indicator;

said memory of said blood processor includes said script and a different script, defining a plurality of scripts;

said blood processor includes a reader reading said indicator of said preparation unit and providing to said microprocessor an indication based on said reading of said indicator; and said microprocessor selecting one of said plurality of scripts based on said indication.

2. The system for controlling the blood processor as set forth in claim 1, wherein said reader is a bar code reader.

3. A system for controlling a blood processor, comprising:

a blood processor having at least one device, a memory, and a microprocessor for controlling said at least one device in accordance with a script stored in said memory;

an external computer having a user interface and having a script generator for generating said script, in a custom interpretive language readable by said microprocessor of said blood processor, in accordance with user input through said user interface; and an interface, for transferring said script to said memory, said interface being contained at least partially in said blood processor, or said external computer, or both said blood processor and said external computer;

wherein:

said at least one device has one or more respective operations;

said script generator includes device information and operation information relating to said at least one device and said one or more respective operations;

said user interface is adapted to display said device information and said operation information; and said external computer generates said script by:

recording a selected set of steps indicating selected ones of said one or more respective operations for said at least one device, and outputting said selected set of steps as said script in said custom interpretive language; and wherein said selected set of steps includes:

a step for separating plasma from cells;

a step for converting fibrinogen in said plasma into a fibrin polymer;

a step for forming a fibrin monomer solution from said fibrin polymer; and a step for transferring said fibrin monomer solution into a liquid container;

wherein:

said step for separating said plasma from said cells comprises spinning whole blood in a first chamber, and moving a piston of a preparation unit to draw said plasma from said first chamber to a second chamber;

said step for converting said fibrinogen into said fibrin polymer comprises mixing said plasma in said second chamber with an enzyme that converts said fibrinogen in said plasma into said fibrin polymer;

said step for forming said fibrin monomer solution from said fibrin polymer comprises releasing a dissolving buffer into said second chamber from said liquid container, and rotating said preparation unit in alternate directions to dissolve said fibrin polymer in said dissolving buffer so as to form said fibrin monomer solution; and said step for transferring said fibrin monomer solution into said liquid container comprises releasing an enzyme capture reagent into said second chamber, manipulating said preparation unit so that said fibrin monomer solution flows into a third chamber of said preparation unit, rotating said preparation unit so that said fibrin monomer solution flows through an annular filter into a fourth chamber of said preparation unit, and then drawing said fibrin monomer solution into said liquid container; and wherein:

said preparation unit has an indicator;

said memory of said blood processor includes said script and a different script, defining a plurality of scripts;

said blood processor includes a reader reading said indicator of said preparation unit and providing to said microprocessor an indication based on said reading of said indicator; and said microprocessor selecting one of said plurality of scripts based on said indication.

4. A system for controlling a blood processor, comprising:

a blood processor having at least one device, a memory, and a microprocessor for controlling said at least one device in accordance with a script stored in said memory;

an external computer having a user interface and having a script generator for generating said script, in a custom interpretive language readable by said microprocessor of said blood processor, in accordance with user input through said user interface; and an interface, for transferring said script to said memory, said interface being contained at least partially in said blood processor, or said external computer, or both said blood processor and said external computer;

wherein:

said at least one device has one or more respective operations;

said script generator includes device information and operation information relating to said at least one device and said one or more respective operations;

said user interface is adapted to display said device information and said operation information; and said external computer generates said script by:

recording a selected set of steps indicating selected ones of said one or more respective operations for said at least one device, and outputting said selected set of steps as said script in said custom interpretive language; and wherein:

said selected set of steps includes one or more steps for processing blood using a preparation unit;

said preparation unit has an indicator;

said memory of said blood processor includes said script and a different script, defining a plurality of scripts;

said blood processor includes a reader reading said indicator of said preparation unit and providing to said microprocessor an indication based on said reading of said indicator; and said microprocessor selects one of said plurality of scripts based on said indication.

5. The system for controlling the blood processor as set forth in claim 4, wherein said reader is a bar code reader.

6. The system for controlling the blood processor as set forth in claim 4, wherein said steps for processing said blood using said preparation unit include:

a step for separating plasma from cells in said preparation unit;

a step for converting fibrinogen in said plasma into a fibrin polymer;

a step for forming a fibrin monomer solution from said fibrin polymer; and a step for transferring said fibrin monomer solution from said preparation unit into a liquid container.

7. The system for controlling the blood processor as set forth in claim 6, wherein:

said step for separating said plasma from said cells comprises spinning whole blood in a first chamber, and moving a piston of said preparation unit to draw said plasma from said first chamber to a second chamber;

said step for converting said fibrinogen into said fibrin polymer comprises mixing said plasma in said second chamber with an enzyme that converts said fibrinogen in said plasma into said fibrin polymer;

said step for forming said fibrin monomer solution from said fibrin polymer comprises releasing a dissolving buffer into said second chamber from said liquid container, and rotating said preparation unit in alternate directions to dissolve said fibrin polymer in said dissolving buffer so as to form said fibrin monomer solution; and said step for transferring said fibrin monomer solution into said liquid container comprises releasing an enzyme capture reagent into said second chamber, manipulating said preparation unit so that said fibrin monomer solution flows into a third chamber of said preparation unit, rotating said preparation unit so that said fibrin monomer solution flows through an annular filter into a fourth chamber of said preparation unit, and then drawing said fibrin monomer solution into said liquid container.

8. A system for controlling a blood processor, comprising:

a blood processor with a microprocessor and memory; and an external computer having a user interface and a script generator;

said blood processor having a plurality of devices, each with one or more respective operations;

said script generator including device information and operation information relating to said plurality of devices and said one or more respective operations;

said user interface being adapted to display said device information and said operation information;

said external computer recording a selected set of steps indicating selected ones of said one or more respective operations for said plurality of devices;

said script generator outputting, as a script, said selected set of steps in a custom interpretive language readable by said microprocessor of said blood processor; and said script being loaded into said memory of said blood processor wherein:

said selected set of steps includes one or more steps for processing blood using a preparation unit;

said preparation unit has an indicator;

said memory of said blood processor includes said script and a different script, defining a plurality of scripts;

said blood processor includes a reader reading said indicator of said preparation unit and providing to said microprocessor an indication based on said reading of said indicator; and said microprocessor selects one of said plurality of scripts based on said indication.

9. The system for controlling the blood processor as set forth in claim 8, wherein said reader is a bar code reader.

10. The system for controlling the blood processor as set forth in claim 8, wherein said steps for processing said blood using said preparation unit include:

a step for separating plasma from cells in said preparation unit;

a step for converting fibrinogen in said plasma into a fibrin polymer;

a step for forming a fibrin monomer solution from said fibrin polymer; and a step for transferring said fibrin monomer solution from said preparation unit into a liquid container.

11. The system for controlling the blood processor as set forth in claim 10, wherein:

said step for separating said plasma from said cells comprises spinning whole blood in a first chamber, and moving a piston of said preparation unit to draw said plasma from said first chamber to a second chamber;

said step for converting said fibrinogen into said fibrin polymer comprises mixing said plasma in said second chamber with an enzyme that converts said fibrinogen in said plasma into said fibrin polymer;

said step for forming said fibrin monomer solution from said fibrin polymer comprises releasing a dissolving buffer into said second chamber from said liquid container, and rotating said preparation unit in alternate directions to dissolve said fibrin polymer in said dissolving buffer so as to form said fibrin monomer solution; and said step for transferring said fibrin monomer solution into said liquid container comprises releasing an enzyme capture reagent into said second chamber, manipulating said preparation unit so that said fibrin monomer solution flows into a third chamber of said preparation unit, rotating said preparation unit so that said fibrin monomer solution flows through an annular filter into a fourth chamber of said preparation unit, and then drawing said fibrin monomer solution into said liquid container.

* * * * *